United States Patent [19]

Hoult

[11] Patent Number: 4,974,209

[45] Date of Patent: Nov. 27, 1990

[54] INTERACTIVE SMOOTHING SYSTEM

[75] Inventor: Robert A. Hoult, Bethel, Conn.

[73] Assignee: The Perkin-Elmer Corporation, Norwalk, Conn.

[21] Appl. No.: 497,802

[22] Filed: Mar. 21, 1990

Related U.S. Application Data

[63] Continuation of Ser. No. 240,773, Sep. 2, 1988, abandoned.

[51] Int. Cl.[5] .............................................. G01J 3/42
[52] U.S. Cl. .................................... 364/497; 364/498; 356/303; 356/319
[58] Field of Search ........... 364/497, 498, 525, 571.01; 356/300, 303, 319, 326; 324/307, 311, 312, 316

[56] References Cited

U.S. PATENT DOCUMENTS

| | | | |
|---|---|---|---|
| 4,238,830 | 12/1980 | Unvala | 364/498 |
| 4,692,883 | 9/1987 | Nelson et al. | 364/497 |
| 4,710,024 | 12/1987 | Fukuma | 364/498 |
| 4,726,679 | 2/1988 | McCaffrey | 356/315 |
| 4,807,148 | 2/1989 | Lacey | 364/497 |

OTHER PUBLICATIONS

Bromba et al, "Digital Filter for Computationally Efficient Smoothing of Noisy Spectra", Analytical Chemistry, vol. 55, No. 8, Jul. 1983, pp. 1299 and 1302.

Primary Examiner—Thomas G. Black
Assistant Examiner—Brian M. Mattson
Attorney, Agent, or Firm—Edwin T. Grimes; Thomas P. Murphy

[57] ABSTRACT

A method identifies components in a sample by spectrally analyzing the sample in a spectrophotometer. The sample data points output from the spectrophotometer are detected in a detector before being stored in an array in a data station. A preselected smoothing bandwidth is entered into the data station from a keyboard. The bandwidth is converted to a strength parameter; and thereafter each of the smoothed data points is stored before being output as an array of smoothed data points to form a modified spectral display, which identifies the components in the sample.

7 Claims, 2 Drawing Sheets

INTERACTIVE SMOOTHING SYSTEM

This is a continuation of co-pending application Ser. No. 07/240,773 filed on 09/02/88 now abandoned.

FIELD OF INVENTION

This invention is directed to smoothing systems and, more particularly, to an interactive smoothing system for use on digital spectrum data from an analytical instrument. It is particularly adapted, among other possible uses, for use with an infrared spectrophotometer.

BACKGROUND OF THE INVENTION

While many different types of smoothing systems have been used heretofore with reasonable success, my contribution to the art is a new smoothing system which is an improvement over such prior art systems, as will become apparent as the description proceeds.

It is known that in smoothing the output or display data from a spectrophotometer, it is desirable to achieve the greatest possible reduction in noise without degrading the resolution. It is also desirable to permit interactive smoothing of the digital spectrum data with a computer of modest processing power, such as for example with a 68000 central processing unit, at a speed comparable to human reaction time, thereby to allow the operator to gauge the optimum smoothing within a reasonable time frame. It is one of the objects of this invention to provide a system affording the aforementioned desired structural and operative features.

SUMMARY OF THE INVENTION

In order to accomplish the desired results, this invention provides, in an analytical instrument including a spectrophophotometer, detector and a data station, a new and improved smoothing system, which includes: a FROM register for storing an array of data points to be smoothed, a modified triangular finite impulse response filter for smoothing the points from the FROM register, a TO buffer for storing the data points subsequent to being smoothed, a keyboard assembly for providing operator control of the degree of smoothing by the filter, and an interactive display unit for displaying the array of data points.

According to one aspect of the invention, the degree of smoothing by said triangular finite impulse response filter is controlled by a continuously variable strength parameter, and the central weight of the triangle filter is equal to the integer part of the strength plus one, and the triangle sits on a platform of height determined by the fractional part of the strength. The central weight of the triangle is depressed by a preselected amount, preferably 0.40625.

According to another aspect of the invention, in order to reduce the number of multiplications and to reduce the computing time, the algorithm is implemented in three parts using successive differences. The first part is the triangular filter calculation which is based on the difference between the current filter value and the previous value. The difference between this difference and the previous difference reduces to a simple three term expression. The second part is a running average of the pedestal or platform height. The third part is the depression of the weight of the central point. The smoothed point will equal the first part plus the second part minus the third part divided by the sum of the weights.

As another aspect of the invention, a subroutine is provided for computing an effective increase ratio in best line width for a smooth ratio of a specified strength, which equals the sum of the weights squared, divided by the sum of the squares of the weights. Another subroutine is provided for determining the smoothing strength required to obtain the aforementioned smooth ratio using successive approximation calculations.

According to still another aspect of the invention, a routine is provided for providing operator control of the degree of smoothing by the filter which includes provision for continuously incrementing or decrementing the degree of smoothing. Another routine provides means for selectively increasing or decreasing the size of the incrementing or decrementing increments.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other assemblies and routines for carrying out the various purposes of the invention. It is important, therefore, that this disclosure be regarded as including such equivalent assemblies and routines as do not depart from the spirit and scope of the invention.

One embodiment of the invention has been chosen for purposes of illustration and description and is shown in the accompanying drawings forming a part of the specification.

DETAILED DESCRIPTION OF A PRESENTLY PREFERRED EMBODIMENT OF THE INVENTION

Although it will be recognized by those skilled in the art that the concepts of the present invention can be used in other types of analytical instruments, the description will be made in conjunction with an infrared spectrophotometer. When subjected to infrared radiation, each functional group of an organic molecule gives rise to absorption bands throughout the spectrum. For a particular functional group, the absorption bands at certain wavelengths are specific, i.e. not the results of interferences, etc., and these bands provide the infrared "fingerprint" of the module.

Figure 1:
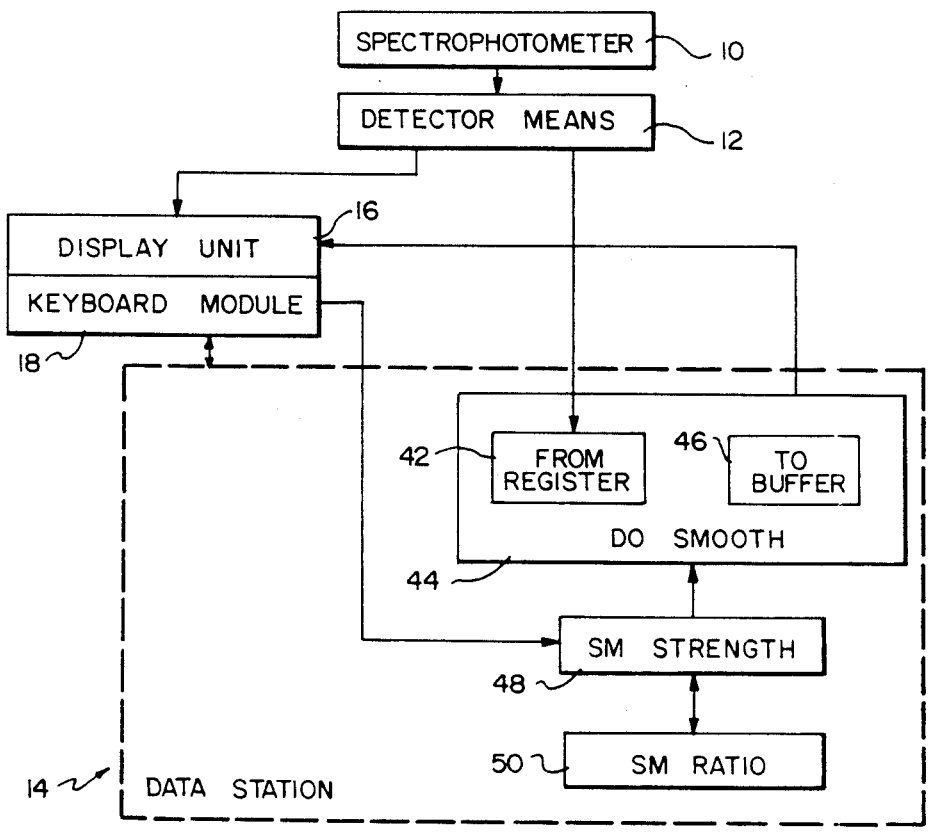
FIG. 1 is a block diagram of an analytical instrument having an interactive smoothing system according to the invention.

The analytical instrument of the present invention may be considered as composed of a spectrophotometer 10, FIG. 1, with detector means 12, a data station indicated generally at 14, a visual display unit 16 and a keyboard module 18. The spectrophotometer 10 may be of any suitable type such as, for example, model 1600, as manufactured by The Perkin-Elmer Corporation. Communication between the operator and the data station 14 is accomplished via the keyboard 18. This keyboard, in addition to the standard terminal format, contains a number of special function keys, which allow the operator to select specific tasks from one of the application programs by depressing the appropriate key on the keyboard. The video screen 16 is used to display commands entered into the system by way of the keyboard 18, to show status and properties of data collected and to view spectra. The screen can be used to view a spectrum directly during a scan and to view the spectrum which results after each step of data processing.

Figure 2:
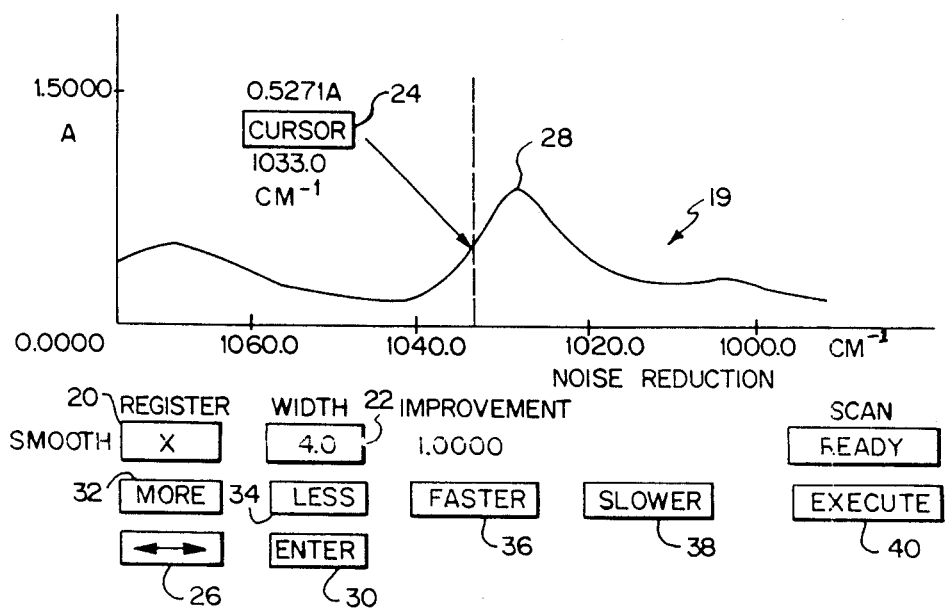
FIG. 2 is a keyboard assembly and display unit.

The purpose of the smooth command is to achieve the greatest reduction in noise without degrading the resolution of the data spectrum 19. When the smooth command button is depressed, the display unit appears as illustrated in FIG. 2. The spectrum storage register is specified at 20, and the smoothing band width is indicated at 22. The upper limit of the smoothing band width is determined as follows: the cursor button 24 is depressed, whereby the vertical graphics cursor appears in the display. Then, the operator moves the cursor to the narrowest significant band in the spectrum or to a very narrow band. Then, the operator expands the spectrum horizontally with the "⟵⟶" key 26 until the narrow band is clearly displayed. Next, the cursor is moved to the point on the left side of the band 28 where the band is approximately half its full height, as illustrated in FIG. 2. The wavenumber at this point is recorded, as shown in the cursor display 24, FIG. 2. This step is repeated for the right side of the band as viewed in FIG. 2. Again, record is made of the wavenumber of the point where the band is at half its full height. The difference in the value of the two wavenumbers obtained is the band width at half height. The smoothing width should not exceed this value.

The smoothing width can be specified in either of the following ways. However, it should in general be kept below the value determined above. The number pad can be used to type in a width, or zero if desired, and the "Enter" key 30 is depressed. The display updates to show the effect of the smooth selected, or to show the unsmoothed spectrum 19 if zero was entered. If desired, a different bandwidth number can be entered, or the width can be modified interactively, by using the soft keys. That is, by depressing the "more" key 32, the field width is incremented. At the same time, the display interactively, or continuously, updates to show the spectrum 19 smoothed according to each new width. In a similar manner, by depressing the "less" key 34, the field width is decremented. At the same time, the display interactively, or continuously, updates to show the spectrum smoothed according to each new width. By depressing the "faster" key 36, the increments and decrements subsequently produced by the "more" and "less" soft keys 32, 34 become larger, and by depressing the "slower" key 38, the increments and decrements subsequently produced by the "more" and "less" soft keys become smaller. When the operator is satisfied with the appearance of the smoothed spectrum 19, the "execute" key 40 is depressed and the system executes the smooth command using the specified smoothing width. The entire spectrum in the storage register currently selected by the "REGISTER" key 20, not just the displayed range, is smoothed, and the smoothed spectrum is displayed over the range currently selected.

This smooth routine in the data station 14, FIG. 1, smooths a specified number of data points of the input data array and delivers the result to the output array. The degree of smoothing is controlled by the operator. As indicated hereinbefore, the operator can select any reasonable bandwidth desired. Typically, 500 points of data, for example, stored in a "FROM" register 42, FIG. 1, are removed in the DOSMOOTH routine 44 and smoothed with the strength specified and then the results are put into a "TO" buffer 46. The program used is a modified triangular finite impulse response filter. In the program, the degree of smoothing is controlled by the strength parameter; increasing the strength means more smoothing. As a very rough approximation the bandwidth is reduced to 1/(1+strength) of its original value. However, since this relationship is far from linear, it is merely an approximation. More accurate conversion between the bandwidth and the strength will be discussed hereinafter.

The central weight of the triangle is equal to the integer part of the expression (strength + 1). However, the triangle sits up on a platform of height determined by the fractional part of the strength, and in addition, the central weight is depressed by 0.40625. The exact value of the central weight depression is not critical and has been chosen because it is convenient in a binary system and multiplying by this factor can be achieved easily by shift and add.

Thus, for a strength of 2.1, the weights are:
0.1, 1.1, 2.1, 2.69375, 2.1, 1.1, 0.1.

Now, if it is desired to smooth point D of a data array consisting of:

| A | B | C | D | E | F | G |
|---|---|---|---|---|---|---|
| point A would be multiplied by 0.1 ||||||||
| point B would be multiplied by 1.1 ||||||||
| point C would be multiplied by 2.1 ||||||||
| point D would be multiplied by 2.69375 ||||||||
| point E would be multiplied by 2.1 ||||||||
| point F would be multiplied by 1.1 ||||||||
| point G would be multiplied by 0.1 ||||||||

D' would equal the sum of these products divided by the sum of the weights, as follows:

$$\text{point } D' = \frac{0.1A + 1.1B + 2.1C + 2.69375D + 2.1E + 1.1F + 0.1G}{0.1 + 1.1 + 2.1 + 2.69375 + 2.1 + 1.1 + 0.1}$$

For a second example, assume a strength of 3.2, then the weights are:
0.2, 1.2, 2.2, 3.2, 3.79375, 3.2, 2.2, 1.2, 0.2.

Now, if it is desired to smooth point E of a data array consisting of:

| A | B | C | D | E | F | G | H | I |
|---|---|---|---|---|---|---|---|---|
| point A would be multiplied by 0.2 |||||||||
| point B would be multiplied by 1.2 |||||||||
| point C would be multiplied by 2.2 |||||||||
| point D would be multiplied by 3.2 |||||||||
| point E would be multiplied by 3.79375 |||||||||
| point F would be multiplied by 3.2 |||||||||
| point G would be multiplied by 2.2 |||||||||
| point H would be multiplied by 1.2 |||||||||
| point I would be multiplied by 0.2 |||||||||

E' would equal the sum of these products divided by the sum of the weights, as follows:

$$\text{point } E' = [0.2A + 1.2B + 2.2C + 3.2D + 3.79375E +$$
$$3.2F + 2.2G + 1.2H + 0.2I] \text{ divided by } [0.2 + 1.2 + 2.2 +$$

-continued
3.2 + 3.79375 3.2 + 2.2 + 1.2 + 0.2]

It will be appreciated that each point in the array would normally have to be calculated separately, which would require an enormous number of calculations including many multiplications. This would be very time consuming for a small computer. To avoid excessive multiplications the algorithm is implemented in three parts using successive differences. The three parts are:

1. integer triangle filter
2. integer running average for the pedestal
3. reduction of the weight of the central point.

As a result the smoothed point, say X', will equal:

$$X' = \frac{\text{triangular filter calculation} + \text{running average for pedestal calculation} - \text{reduction of the weight of the central point calculation}}{\text{sum of the weights}}$$

$$X' = \frac{SUM\ 2' + RA - CPR}{(n+1)2 + f*(2n+3) - 0.40625}$$

Referring first to the integer triangle filter, basically, the difference between the current filter value and the previous value for a strength of 2 can be expressed:

|    |    |    | 1  | 2  | 3  | 2  | 1 |
|----|----|----|----|----|----|----|----|
|    | 1  | 2  | 3  | 2  | 1  |    |   |
|    | −1 | −1 | −1 | 1  | 1  | 1  |   |
| −1 | −1 | −1 | 1  | 1  | 1  |    |   |
| 1  | 0  | 0  | −2 | 0  | 0  | 1  |   | and the difference between this difference and the previous difference can be reduced to a simple three term expression. Mathematically, the results of this triangle filter can be expressed, as follows:

$$SUM\ 0 = X_{[i-n-1]} - 2*X_{[1-1]} + X_{[i+n-1]}$$
$$SUM\ 1' = SUM\ 1 + SUM\ 0$$
$$SUM\ 2' = SUM\ 2 + SUM\ 1$$

Where:
X = data input point
* means multiplication
i = index of the output point to be generated
n = the filter central weight or half-length
SUM = intermediate summation Referring next to the second of the three parts, running average for the pedestal calculation, which can be expressed, as follows:

$$SUM\ 3' = SUM\ 3 - X_{[i-n-1]} + x_{[i+n]}$$
$$RA = SUM\ 3' * f$$

Where:
RA = running average
X = data input point
* means multiplication
i = index of the output point to be generated
n = the filter central weight or half-length
f = fractional part of strength
SUM = intermediate summation Referring next to the third of the three parts, reduction of the weight of the central point calculation, which can be expressed as follows:

Central Point Reduction = CPR = 0.40625* $x_{[i]}$

Where:
CPR = reduction of the weight of the central point
* means multiplication
x = data input point
i = index of the central weight or half-length It would appear that there are starter and ender problems because you run out of prior or post data points at the ends of the data array. That is, with the difference calculations the next points are derived from the previous points, but it is necessary to have something to start with. To overcome this problem or initialize those intermediate sums, it is assumed that all values prior to the first data point are the same as the first data point. As a result, the differences are zero. Thus, the intermediate sums are easily initialized.

The program for doing DOSMOOTH is illustrated, as follows:

```
*****    included files           *****
*           none
*****    imported functions       *****
*
         globl    a.ldtl           * integer fix
         globl    fprecip          * floating point reciprocal
*****    stack variable equates    *****
*
fraction = 8
shifts = 10
*****    subroutine dosmooth      *****
*
         .text
         .even
         .globl    _dosmooth
_dosmooth:
*
*save registers
         movem.l  d3-d5/a3-a6,-(a7)
* reserve space for variables
         sub .w   #12,a7
* get parameters
         movem.l  44(a7),d1/d2/d7/a2/a3
* fix strength with 16 bits of fraction
         add.l    #0x01000000,d1    *times 65536
         jsr      a.ldtl
         move.l   d0,d3
         clr.w    d3
         swap     d3
*save the fraction
         move.w   d0,fraction(a7)
*compute n+1
         addq.w   #1,d3
*compute 2n+3
         move.w   d3,d4
         add.w    d4,d4
         addq.w   #1,d4
*compute (n+1).2
         move.w   d3,d5
         mulu     d3,d5
* compute sum of coefficients (n+1)'2 + fraction*(2n+3)
 −0.40625
         mulu     d4,d0
         swap     d5
         add.l    d5,d0
         swap     d5
         sub.l    #0x6800,d0
* left justify, counting shifts
         moveq    #15,d1
i1:      add.l    d0,d0
         dbmi     d1,i1
         move.w   d1,shifts(a7)
* compute reciprocal weight
         jsr      fprecip
         move.l   d0,a6
```

```
* initialise array end-pointers
    move.l      a2,a4
    move.l      a4,a5
    subq.l      #1,d7
    asl.l       #2,d7
    add.l       d7,a5
* initialise centre triangle pointer
    move.l      a2,a1
    asl.l       #2,d3
    sub.l       d3,a1
* initialise trailing edge pointer
    move.l      a1,a0
    sub.l       d3,a0
* get absolute value of first input point, noting sign
    move.l      (a2),d0
    smi         d2
    bpl.s       i2
    neg.l       d0
i2:
* ... and split it ready for multiply
    move.w      d0,d1
    swap        d0
* initialise running sum = (2n+3) * from[0]
    move.w      d4,d7
    mulu        d0,d4
    mulu        d1,d7
    swap        d4
    move.w      d4,d6
    clr.w       d4,
    add.l       d4,d7
    addx.w      d4,d6
* initialise triangle sum = (n+1)'2 * from[0]
    move.w      d5,d3
    mulu        d0,d3
    mulu        d1,d5
    swap        d3
    move.w      d3,d4
    clr.w       d3
    add.l       d3,d5
    addx.w      d3,d4
* restore signs
    tst.b       d2
    bpl.s       i3
    neg.l       d7
    negx.w      d6
    neg.l       d5
    negx.w      d4
i3:
* initialise intermediate sum
    moveq       #0,d2
    moveq       #0,d3
*
*
*
*
***         smooth loop          ***
loop:
*
* subtract trailing edge from running sum
    cmp.l       a4,a0                * check lower array bound
    bcc.s       11
    addq.l      #4,a0
    move.l      (a4),d1              * substitute first data point
    bra.s       12
11: move.l      (a0)+,d1
12: smi         d0                   * sign extend
    ext.w       d0
    sub.l       d1,d7
    subx.w      d0,d6
* add trailing edge of triangle
    add.l       d1,d3
    addx.w      d0,d2
* subtract 2* previous midpoint of triangle
    cmp.l       a4,a1
    bcc.s       13
    addq.l      #4,a1
    bra.s       14
13: move.l      (a1)+,d1
    smi         d0
    ext.w       d0
14: sub.l       d1,d3
    subx.w      d0,d2
    sub.l       d1,d3
    subx.w      d0,d2
* add leading edge of triangle
    cmp.l       a2,a5                * check upper array bound
    bcc.s       15
    move.l      (a5),d1              * substitute last point
    bra.s       16
15: move.l      (a2)+,d1
16: smi         d0
    ext.w       d0
    add.l       d1,d3
    addx.w      d0,d2
* add leading edge to running sum
    cmp.l       a2,a5
    bcs.s       17
    move.l      (a2),d1
    smi         d0
    ext.w       d0
17: add.l       d1,d7
    addx.w      d0,d6
* add intermediate triangle sum to final triangle sum
    add.l       d3,d5
    addx.w      d2,d4
*
** short-circuit loop, if centre of filter lies before array
    cmp.l       a4,a1
    bcs.s       loop
*
* save intermediate sums
    movem.l     d2/d3,(a7)
    swap        d4
* take absolute value of running sum, noting sign
    move.l      d7,d1
    move.w      d6,d0
    smi         d4
    bpl.s       18
    neg.l       d1
    negx.w      d0
18:
* multiply by fraction
    move.w      fraction(a7),d3
    move.w      d1,d2
    swap        d1
    mulu        d3,d0
    mulu        d3,d1
    mulu        d3,d2
    move.w      d0,d2
    clr.w       d0
    swap        d0                   * note top of d0 is 0
    swap        d2
    add.l       d2,d1
    clr.w       d2
    addx.w      d2,d0
* restore sign
    tst.b       d4
    bpl.s       19
    neg.l       d1
    negx.w      d0
19:
* add triangle sum
    swap        d4                   * restore temporarily
    add.l       d5,d1
    addx.w      d4,d0
    swap        d4
* multiply by 2
    add.l       d1,d1
    addx.w      d0,d0
* subtract 0.8125 * central point
    move.l      (a1),d3
    move.l      d3,d2
    asr.l       #3,d2
    sub.l       d2,d3
    asr.l       #1,d2
    sub.l       d2,d3
    smi         d2
    ext.w       d2
    sub.l       d3,d1
    subx.w      d2,d0
* take absolute value, noting sign
    smi         d4
    bpl.s       110
    neg.l       d1
```

-continued
```
         negx.w    d0
110:
* shift right, retaining 32 bits
         move.w    shifts(a7),d3
         ror.l     d3,d0              * note top word was 0
         lsr.l     d3,d1
         add.l     d1,d0
* scale
         move.l    a6,d3              * get multiplier
         move.w    d0,d2
         swap      d0
         move.w    d0,d1
         mulu      d3,d1
         swap      d3
         mulu      d3,d0
         mulu      d3,d2
         add.l     d2,d1
         clr.w     d1
         addx.w    d1,d1
         swap      d1
         add.l     d1,d0
* restore sign
         tst.b     d4
         bpl.s     111
         neg.l     d0
111:
* output result
         move.l    d0,(a3)+
*
* restore sums
         swap      d4
         movem.l   (a7),d2/d3
*
*** loop ends
         cmp.l     a5,a1
         bcs       loop
*
*
* restore registers and return
         add.w     #12,a7
         movem.l   (a7)+,d3-d5/a3-a6
         rts
```

As seen in FIG. 1, subroutines SMSTRENGTH 48 and SMRATIO 50 are corollaries to the routine DOSMOOTH. It is noted that the user thinks in terms of the smoothing bandwidth 22, as discussed hereinbefore. However, the program operates in unitless terms. Therefore, it is necessary to translate or convert the bandwidth to a unitless term. The term smoothing ratio is a unitless term that is directly related to the bandwidth. Hereinbefore, it was indicated that the bandwidth or smoothing ratio was approximately equal to $1/(1+\text{strength})$. In using SMSTRENGTH and SMRATIO, this relationship is developed very accurately.

The routine SMRATIO computes the effective increase ratio in best line width for a smooth of the specified strength, as follows:

$$SMRATIO = \frac{(\text{sum of the Weights})^2}{\text{sum of the squares of the weights}}$$

$$= \frac{[(n + 1)^2 + f^*(2n + 3) - 0.40625]^2}{n(n + 1)(2n + 1)/3 + 2f^*s^*(n + 1) + (s + 1 - 0.40625)^2}$$

Where:
 s = strength
 f = fractional part of strength
 n = integer part of strength
 * means multiplication The program for computing the SMRATIO is illustrated, as follows:

```
/***** subroutine smratio *****/
DOUBLE   smratio(strength)
DOUBLE   strength;
(
LONG     n;       /* integer part of strength */
LONG     n1;      /* n + 1 */
DOUBLE   f;       /* fractional part of strength */
DOUBLE   wsq;     /* sum of squares of weights */
DOUBLE   sqw;     /* square of sum of weights */
/* split strength into integer and fraction */
    n = strength;
    f = strength - n;
    n1 = n + 1;
/* compute sum of squares of weights */
    wsq = strength + (1.0 - DEPRESS);
    wsq *= wsq;
    wsq += (n * n1 * (n + n1)/3) + f * strength * (n1 + n1);
/* compute square of sum of weights */
    sqw = f * (n1 + n1 + 1) - DEPRESS + (n1 * n1);
    sqw *= sqw;
/* return ratio */
    return(sqw/wsq);
)
```

The problem with the SMRATIO formula is that it derives the width from the strength when what is actually needed is the strength from the width. As a result, the SMSTRENGTH subroutine is used to determine the smoothing strength needed to achieve the specified target smoothing ratio. This requires the solution of a quartic equation, and instead Newton's method of successive approximation is used here. The initial bracketing guesses for the strength are set at the integer values above and below the target result, since at these points the slop is discontinuous. As a result of the monotonicity of the function, the successive approximations then remain within this interval. That is, successive iterations are performed until the strength corresponding to the target smoothing ratio is determined. This smoothing strength is then used in the basic DOSMOOTH routine.

The program for computing the SMSTRENGTH is illustrated, as follows:

```
/***** subroutine smstrength *****/
DOUBLE    smstrength(target)
DOUBLE    target;
(
COUNT     iter;    /* number of iterations */
LONG      n;       /* integer part of strength */
DOUBLE    x;       /* general strength trial value */
DOUBLE    x1;      /* first strength trial value */
DOUBLE    x2;      /* second strength trial value */
DOUBLE    y;       /* general smoothing ration */
DOUBLE    y1;      /* first ratio */
DOUBLE    y2;      /* second ratio */
DOUBLE    error;   /* error in strength */
DOUBLE    temp;    /* temporary value */
/* initialise */
    iter = 0;
    n = target/1.5;
    x1 = n;
    y1 = smratio(x1);
    if (y1 >= target
(
    y2 = y1;
    x2 = x1;
```

-continued
```
    x1 = n - 1;
    y1 = smratio(x1);
)
else
(
    x2 = n + 1;
    y2 = smratio(x2);
)
error = y2 - target;
/* iteration loop */
    while (error > LIMIT) && (iter < MAXITER))
    (
    /* interpolate new quess */
        temp = error/(y2 - y1);
        x = x2 - (x2 - x1) * temp;
        y = smratio(x);
    /* if quess is nearer to y2, extrapolate new x 1,y1 */
        if (temp < 0.5)
        (
            temp = x2 - (x2 - x) * error/(y2 - y);
            if (temp > x 1
            (
                x1 = temp;
                y1 = smratio(x1);
            )
        )
    /* move x2,y2 */
        y2 = y;
        x2 = x;
    /* compute new error */
        error = y2 - target;
        itertt;
    )
/* return the result */
    return(x2);
)
```

Figure 3:
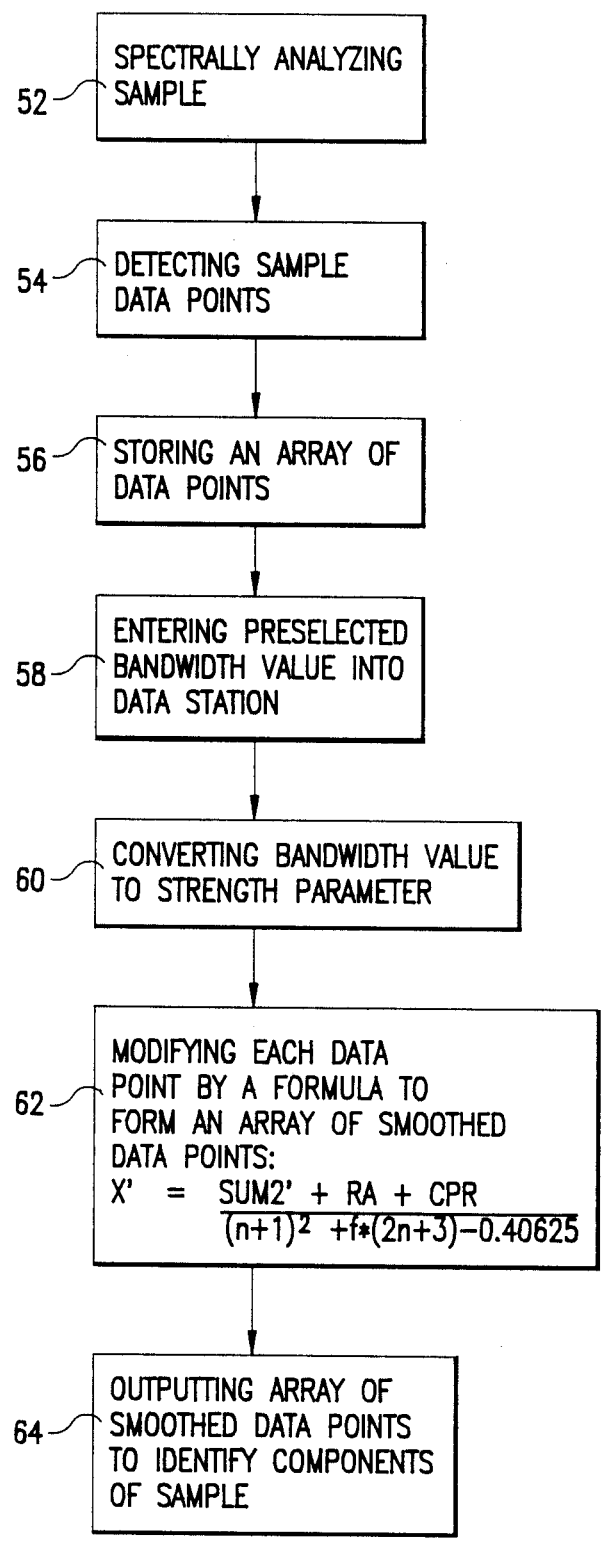
FIG. 3 is a flow chart of a method of identifying components in a sample in accordance with the present invention.

FIG. 3 is a flow chart showing a summary of a method of identifying components in a sample in accordance with one form of the present invention.

The method includes spectrally analyzing a sample 52, FIG. 3, in the spectrophotometer 10, FIG. 1, and detecting sample data points 54, FIG. 3, in a detector 12, FIG. 1, outputted from the spectrophotometer. The next steps in the method comprise storing an array of data points 56, FIG. 3, in a data station 14, FIG. 1, entering a preselected bandwidth value into the data station, 58, FIG. 3; and converting the bandwidth value to a strength parameter. Thereafter, the method includes the steps of modifying each data point by a formula SUM2′+RA+CPR divided by $(n+1)^2 + f*(2n+3) - 0.40625$ to form an array of smoothed data points 62, FIG. 3, and then outputting the array of smoothed data points to identify the components of the sample 64, FIG. 3.

It will then be seen that the present invention does indeed provide a new and improved interactive smoothing system which produces substantial reduction in noise without degrading the resolution and which permits interactive smoothing with a computer of modest processing power.

Although a certain particular embodiment of the invention is herein disclosed for purposes of explanation, further modification thereof, after study of this specification, will be apparent to those skilled in the analytical instrument art to which the invention pertains. Reference should accordingly be had to the appended claims in determining the scope of the invention.

What is claimed is:

1. A method of identifying components in a sample, comprising the steps of:

(a) receiving and spectrally analyzing the sample in a spectrophotometer, (b) detecting sample data points output from said spectrophotometer in a detector, (c) storing an array of data points detected by said detector in a data station, (d) entering a preselected smoothing bandwidth value into said data station from a keyboard, (e) converting said smoothing bandwidth value to a strength parameter, (f) modifying each of said data points in said stored array to form an array of smoothed data points by the formula:

$$x^1 = \frac{\text{SUM 2} + \text{SUM 1} + x_{[1-n-1]} - 2 * x_{[1-1]} + x_{[i+n-1]}}{(n+1)^2}$$

where $x^1$ is said modified data point; x is the data input point; * means multiplication; i is an index of the output point to be generated; n is said strength parameter; SUM 1 is a first intermediate summation; and SUM 2 is a second intermediate summation, and (g) outputting said array of smoothed data points to a display unit to display a modified spectrum which identifies the components in said sample.

2. A method of identifying components in a sample, comprising the steps of:

(a) receiving and spectrally analyzing a sample in a spectrophotometer, (b) detecting sample data points output from said spectrophotometer in a detector, (c) storing an array of data points detected by said detector in a data station, (d) entering a preselected smoothing bandwidth value into said data station from a keyboard, (e) converting said smoothing bandwidth value to a strength parameter, (f) modifying each of said data points in said stored array to form an array of smoothed data points by the formula:

$x^1$ equals SUM 2 + SUM 1 + $x_{[i-n-1]}$ − 2 * $x_{[i-1]}$ +

$x_{[i+n-1]}$ plus [SUM 3 − $x_{[i-n-1]}$ + $x_{[i+n]}$] * $f$ plus 0.40625 * x divided by $[(n+1)^2 + f*(2n+3) - 0.40625]$ where: $x^1$ is said modified data point; x is the data input point; * means multiplication; i is an index of the output point to be generated; n is the integer part of said strength parameter; f is the fractional part of said strength parameter; SUM 1 is a first intermediate summation; SUM 2 is a second intermediate summation; and SUM 3 is a third intermediate summation, and (g) outputting said array of smoothed data points to a display unit to display a modified spectrum which identifies the components in said sample.

3. The method according to claim 2 wherein the intermediate summations of step (f) are set equal to zero when calculating initial points and trailing points of said array of data points.

4. The method according to claim 2 wherein the step of converting said smoothing bandwidth to a strength parameter is based on the formula:

bandwidth value =

$$\frac{[(n + 1)^2 + f*(2n + 3) - 0.40625]^2}{n(n + 1)(2n + 1)/3 + 2f*s*(n + 1) + (s + 1 - 0.40625)^2}$$

where:

S = strength parameter f = fractional part of strength parameter n = integer part of strength parameter

* = means multiplication.

5. The method according to claim 2 wherein steps (a) to (g) are repeated a plurality of times, while incrementing the bandwidth value for each repeat.

6. The method according to claim 5 wherein the size of the increment is increased for each successive repeat.

7. A method for determining a maximum smoothing bandwidth of a spectrum, comprising the steps of:
(a) displaying a spectrum,
(b) moving a cursor to a narrow band in the spectrum,
(c) expanding the spectrum horizontally until the narrow band is displayed,
(d) moving the cursor to a point on one side of the band where the band is one-half its full height and record a wavenumber at this point,
(e) moving the cursor to a second point on a second side of the band where the band is one-half its full height and record a wavenumber at the second point,
(f) substracting the wavenumber at the first point from the wavenumber at the second point to determine the maximum smoothing bandwidth value of said spectrum.

* * * * *